(12) United States Patent
Kashiwai et al.

(10) Patent No.: US 8,602,152 B2
(45) Date of Patent: Dec. 10, 2013

(54) VIBRATION DAMPING APPARATUS FOR SADDLE RIDING TYPE VEHICLE

(75) Inventors: Mikio Kashiwai, Saitama (JP); Konomu Hoshi, Saitama (JP); Takeshi Kimishima, Saitama (JP); Kazuma Morimitsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 333 days.

(21) Appl. No.: 13/047,162

(22) Filed: Mar. 14, 2011

(65) Prior Publication Data

US 2011/0226543 A1    Sep. 22, 2011

(30) Foreign Application Priority Data

Mar. 16, 2010   (JP) .................................. 2010-059143

(51) Int. Cl.
*B60K 1/00*      (2006.01)
*B62D 21/00*     (2006.01)

(52) U.S. Cl.
USPC .......................................... 180/300; 180/311

(58) Field of Classification Search
USPC ............... 280/274, 275, 281.1, 283; 180/300, 180/311, 291; 296/35.1, 190.07; 248/638, 248/562, 636, 560
See application file for complete search history.

(56) References Cited

U.S. PATENT DOCUMENTS

| | | | | |
|---|---|---|---|---|
| 4,781,264 A * | 11/1988 | Matsuzaki et al. | ............. | 180/219 |
| 5,487,443 A * | 1/1996 | Thurm | ............. | 180/227 |
| 5,749,591 A * | 5/1998 | Thurm | ............. | 280/284 |
| 6,357,546 B1 * | 3/2002 | Crosby, Jr. | ............. | 180/227 |
| 6,505,847 B1 * | 1/2003 | Greene | ............. | 280/284 |
| 6,648,356 B2 * | 11/2003 | Osmecki | ............. | 280/284 |
| 7,380,808 B2 * | 6/2008 | D'Aluisio et al. | ............. | 280/275 |
| 7,503,415 B2 * | 3/2009 | Hasegawa et al. | ............. | 180/228 |
| 7,510,039 B2 * | 3/2009 | Tsujii et al. | ............. | 180/219 |
| 7,546,894 B1 * | 6/2009 | Glenn | ............. | 180/227 |
| 7,967,316 B2 * | 6/2011 | Chisuwa | ............. | 280/288.4 |
| 8,453,786 B2 * | 6/2013 | Hock et al. | ............. | 180/311 |
| 2002/0066611 A1 * | 6/2002 | Lane et al. | ............. | 180/228 |
| 2007/0262558 A1 * | 11/2007 | Segato | ............. | 280/283 |

FOREIGN PATENT DOCUMENTS

| | | |
|---|---|---|
| DE | 10 2004 051 208 A1 | 7/2005 |
| EP | 1270390 A1 | 1/2003 |
| JP | 62-137287 A | 6/1987 |
| JP | 2007-145268 A | 6/2007 |
| JP | 2009-190454 A | 8/2009 |

\* cited by examiner

*Primary Examiner* — J. Allen Shriver, II
*Assistant Examiner* — James M Dolak
(74) *Attorney, Agent, or Firm* — Birch, Stewart, Kolasch & Birch, LLP

(57) ABSTRACT

A vibration damping apparatus for a saddle riding type vehicle that easily secures stiffness of a vehicle body frame, simplifies structure, and improves a degree of freedom in layout. The vibration damping apparatus includes at least a pair of mutually facing surfaces disposed on the vehicle body frame, the surfaces not being relatively displaceable while the vehicle is stationary, and being relatively displaceable while the vehicle is running. A damping member is fixed to each of the surfaces and is disposed therebetween. The damping member is not subject to load while the vehicle is stationary. One of the surfaces is disposed on a side of a first main frame of a pair of left and right main frames and the other of the surfaces is disposed on a side of a second main frame.

5 Claims, 11 Drawing Sheets

VIBRATION DAMPING APPARATUS FOR SADDLE RIDING TYPE VEHICLE

CROSS-REFERENCE TO RELATED APPLICATION

The present application claims priority under 35 U.S.C. §119 to Japanese Patent Application No. 2010-059143, filed Mar. 16, 2010, the entire contents of which are hereby incorporated by reference.

BACKGROUND OF THE INVENTION

1. Field of the Invention

The present invention relates, in general, to vibration damping apparatuses for saddle riding type vehicles and, in particular, to a vibration damping technique in a saddle riding type vehicle, such as a motorcycle, that can damp vibrational behavior, such as weave, wobble, and chattering.

2. Description of Background Art

A known vibration damping apparatus for a saddle riding type vehicle incorporates an elastic member interposed between members constituting a vehicle body frame in order to reduce vibration at low frequencies, as shown, for example, in Japanese Patent Laid-open No. Sho 62-137287 or Japanese Patent Laid-open No. 2007-145268.

Another known vibration damping apparatus incorporates a damper device to damp vibration of the vehicle body which vibration may cause chattering. The damper device includes, as disclosed in Japanese Patent Laid-open No. 2009-190454, a piston rod (120) and a piston (130) that make a stroke motion with an external input applied thereto, an inner tube (140) packed with a fluid (e.g. oil), and a tubular outer tube (160) covering the inner tube (140).

In each of the apparatuses disclosed in Japanese Patent Laid-open No. Sho 62-137287 and Japanese Patent Laid-open No. 2007-145268, each member for receiving load (bearing load) in constituting the vehicle body frame is connected with each other via the elastic member, which makes it difficult to ensure stiffness of the vehicle body frame.

The apparatus disclosed in Japanese Patent Laid-open No. 2009-190454 has a drawback of a limited position at which the damper device can be disposed, since the damper device has a complicated structure and vibration can be effectively damped only if a direction of piston motion coincides with that of vibration.

It is therefore an object of the present invention to provide a vibration damping apparatus for a saddle riding type vehicle that easily secures stiffness of a vehicle body frame, simplifies structure, and improves a degree of freedom in layout.

SUMMARY AND OBJECTS OF THE INVENTION

To achieve the foregoing object, the present invention provides a vibration damping apparatus for a saddle riding type vehicle having a vehicle body frame.

According to an embodiment of the present invention, the vibration damping apparatus includes: at least a pair of mutually facing surfaces, disposed on the vehicle body frame, the surfaces not being relatively displaceable while the vehicle is stationary and being relatively displaceable while the vehicle is running; and a damping member fixed to each of the surfaces and disposed therebetween, the damping member not being subject to load while the vehicle is stationary.

According to an embodiment of the present invention, the vehicle body frame includes a pair of left and right main frames; and a first surface of the pair of surfaces is disposed on a side of a first main frame of the pair of left and right main frames and a second surface of the pair of surfaces is disposed on a side of a second main frame of the pair of left and right main frames.

If the pair of left and right main frames includes a pair of left and right swing arm support portions disposed at rear portions thereof, the swing arm support portions for supporting vertically swingably a swing arm that rotatably supports a rear wheel of the vehicle, the first surface is disposed on a first swing arm support portion of the pair of left and right swing arm support portions and the second surface is disposed on a second swing arm support portion of the pair of left and right swing arm support portions.

According to an embodiment of the present invention, if the vehicle includes an engine mounted thereon, the vehicle body frame includes: a front-side engine hanger portion which droops down at a front portion of the engine and to which the front portion of the engine is fixed; a rear-side engine hanger portion which droops down at a rear portion of the engine and to which the rear portion of the engine is fixed; and a sub-frame connecting the front-side engine hanger portion and the rear-side engine hanger portion; and a first surface of the pair of surfaces is disposed on a side of the sub-frame and a second surface of the pair of surfaces is disposed on a side of the front-side engine hanger portion or the rear-side engine hanger portion.

According to an embodiment of the present invention, if the vehicle body frame includes a main frame extending longitudinally; and a seat rail, extending rearwardly from the main frame, for supporting a seat on which an occupant sits, a first surface of the pair of surfaces is disposed on a side of the main frame and a second surface of the pair of surfaces is disposed on a side of the seat rail.

According to an embodiment of the present invention, if the vehicle body frame includes a main frame extending longitudinally; a pair of left and right seat rails, extending rearwardly from the main frame, for supporting a seat on which an occupant sits; and a seat rail connecting portion connecting the seat rails, a first surface of the pair of surfaces is disposed on a side of at least a first seat rail of the pair of left and right seat rails and a second surface of the pair of surfaces is disposed on a side of the seat rail connecting portion.

According to an embodiment of the present invention, if the vehicle body frame includes a main frame extending longitudinally; and a pair of left and right seat rails, extending rearwardly from the main frame, for supporting a seat on which an occupant sits, a first surface of the pair of surfaces is disposed on a side of a first seat rail of the pair of left and right seat rails and a second surface of the pair of surfaces is disposed on a side of a second seat rail of the pair of left and right seat rails.

According to an embodiment of the present invention, the present invention further provides a vibration damping apparatus for a saddle riding type vehicle having a vehicle body frame and an engine disposed on the vehicle body frame. The vibration damping apparatus includes: at least a pair of mutually facing surfaces, disposed in a space between the vehicle body frame and the engine, the surfaces not being relatively displaceable while the engine and the vehicle are stationary and being relatively displaceable while the engine is operating or the vehicle is running, a first surface of the pair of surfaces being disposed on a side of the vehicle body frame and a second surface of the pair of surfaces being disposed on a side of the engine; and a damping member fixed to each of the surfaces and disposed therebetween, the damping member not being subject to load while the engine and the vehicle are stationary.

According to an embodiment of the present invention, the damping member includes a sheet-like high-damping rubber on which a shearing force acts in a relative parallel displacement between each of the surfaces.

In the application concerned, "load not being applied while the vehicle is stationary" means to include a condition, in which load initially acts on the damping member due to an error produced when the vehicle body frame is manufactured or the occupant riding in the vehicle. A manufacturing error invariably occurs when the pair of surfaces and the damping member fixed each of the pair of surfaces are manufactured and an initial slight load arising from the error invariably acts on the damping member. In addition, the occupant's riding on the vehicle does cause a slight load to act on the damping member. Therefore, "load not being applied while the vehicle is stationary" means that the condition of "load not being applied while the vehicle is stationary" includes a condition in which load arising from the error or the occupant's riding on the vehicle is applied. The same holds true with "load not being applied while the engine and the vehicle are stationary."

The effects of the invention include the following:

The vibration damping apparatus for the saddle riding type vehicle according to the present invention includes, in the vehicle body frame, the damping member that is fixed to each of at least the pair of mutually facing surfaces that are to be relatively displaceable when the vehicle is running and disposed therebetween. When vibration that causes the pair of surfaces to be relatively displaced occurs as a result of the vehicle running, the vibration is damped by the damping member. Specifically, a damping effect of the vehicle body frame is achieved.

When the vehicle is stationary, the pair of surfaces is not relatively displaced and no load is applied, when the vehicle is stationary, to the damping member fixed to each of the surfaces in a space therebetween. When vibration that causes the pair of surfaces to be relatively displaced occurs, load (dynamic load) acts on the damping member, so that the vibration is effectively damped by the damping member. Specifically, assuming that load initially acts on the damping member even while the vehicle is stationary, a damping capacity which the damping member innately possesses is impaired for the load, so that the damping effect is reduced when the load (dynamic load) acts on the damping member. In the present invention, however, because of no initial load acting on the damping member, an effective damping effect can be achieved when the vibration occurs.

The fact that no load is applied to the damping member fixed to each of the surfaces between the pair of surfaces while the vehicle is stationary means that the damping member does not act on stiffness of the vehicle body frame as springs in series. Accordingly, in the vibration damping apparatus according to the present invention, the damping member functions as springs in parallel, which makes it easy to achieve stiffness of the vehicle body frame even if an elastic member having a low stiffness is used.

In addition, the vibration damping apparatus according to the present invention can be configured by disposing, in the vehicle body frame, at least the pair of mutually facing surfaces that are not to be relatively displaced while the vehicle is stationary and are to be relatively displaced while the vehicle is running and, in the space between the pair of surfaces, the damping member which is fixed to each of the surfaces and to which no load is applied while the vehicle is stationary. The structure can therefore be simplified and a degree of freedom in disposition is improved.

Specifically, the vibration damping apparatus according to the present invention achieves effects of stiffness of the vehicle body frame being easily ensured, a simplified structure, and an improved degree of freedom in disposition. Moreover, an effective damping effect can be achieved when vibration does occur.

Additionally, the vehicle body frame includes a pair of left and right main frames; and a first surface of the pair of surfaces is disposed on the side of a first main frame of the pair of left and right main frames and a second surface of the pair of surfaces is disposed on the side of a second main frame of the pair of left and right main frames. Stiffness of the vehicle body frame can therefore be improved by the pair of left and right main frames.

If the vehicle body frame includes the pair of left and right main frames, however, vibration unique to each of the left and right main frames can be produced while the vehicle is running.

By disposing the first surface on the side of a first main frame of the pair of left and right main frames and the second surface on the side of a second main frame, the vibration produced in each of the left and right main frames can be effectively damped.

If the pair of left and right main frames includes a pair of left and right swing arm support portions disposed at rear portions thereof, the swing arm support portions for supporting vertically swingably the swing aim that rotatably supports the rear wheel of the vehicle, the first surface is disposed on a first swing arm support portion of the pair of left and right swing arm support portions and the second surface is disposed on a second swing aim support portion of the pair of left and right swing arm support portions. Through the foregoing arrangement, vibration that tends to occur alternately between the left and right swing arm support portions can be effectively damped.

If the vehicle includes an engine mounted thereon, preferably, the vehicle body frame includes: the front-side engine hanger portion which droops down at the front portion of the engine and to which the front portion of the engine is fixed; the rear-side engine hanger portion which droops down at the rear portion of the engine and to which the rear portion of the engine is fixed; and the sub-frame connecting the front-side engine hanger portion and the rear-side engine hanger portion; and a first surface of the pair of surfaces is disposed on the side of the sub-frame and a second surface of the pair of surfaces is disposed on the side of the front-side engine hanger portion or the rear-side engine hanger portion. These arrangements allow vibration produced from the engine to be effectively damped.

If the vehicle body frame includes the main frame extending longitudinally; and the seat rail, extending rearwardly from the main frame, for supporting the seat on which the occupant sits, a first surface of the pair of surfaces is disposed on the side of the main frame and a second surface of the pair of surfaces is disposed on the side of the seat rail. These arrangements allow vibration produced in the seat rail and the main frame with the weight of the occupant borne thereby to be effectively damped.

If the vehicle body frame includes the main frame extending longitudinally; a pair of left and right seat rails, extending rearwardly from the main frame, for supporting the seat on which the occupant sits; and the seat rail connecting portion connecting the seat rails, a first surface of the pair of surfaces is disposed on the side of at least a first seat rail of the pair of left and right seat rails and a second surface of the pair of surfaces is disposed on the side of the seat rail connecting portion. Through these arrangements, vibration produced in the seat rails can be effectively damped and, at the same time, stiffness of the seat rails can be enhanced by the seat rail connecting portion.

If the vehicle body frame includes the main frame extending longitudinally; and a pair of left and right seat rails, extending rearwardly from the main frame, for supporting the seat on which the occupant sits, a first surface of the pair of surfaces is disposed on the side of a first seat rail of the pair of left and right seat rails and a second surface of the pair of surfaces is disposed on the side of a second seat rail of the pair of left and right seat rails. These arrangements allow vibration produced in the pair of left and right seat rails to be effectively damped.

The vibration damping apparatus for the saddle riding type vehicle according to the present invention includes, in the space between the vehicle body frame and the engine, the damping member that is fixed to each of at least the pair of mutually facing surfaces that are to be relatively displaceable when the vehicle is running or the engine is operating and that is disposed therebetween. When vibration that causes the pair of surfaces to be relatively displaced occurs as a result of the vehicle running or the engine operating, the vibration is damped by the damping member. Since the pair of surfaces is disposed between the vehicle body frame and the engine, vibration that is transmitted from the engine to the vehicle body frame, in particular, is effectively damped. Specifically, a damping effect of the engine and the vehicle body frame is achieved.

When the engine and the vehicle are stationary, the pair of surfaces is not relatively displaced and no load is applied, when the engine and the vehicle are stationary, to the damping member fixed to each of the surfaces in the space therebetween. When vibration that causes the pair of surfaces to be relatively displaced occurs, load (dynamic load) acts on the damping member, so that the vibration is effectively damped by the damping member. Specifically, assuming that load initially acts on the damping member even while the engine and the vehicle are stationary, a damping capacity which the damping member innately possesses is impaired for the load, so that the damping effect is reduced when the load (dynamic load) acts on the damping member. In the present invention, however, because of no initial load acting on the damping member, an effective damping effect can be achieved when the vibration occurs.

The fact that no load is applied to the damping member fixed to each of the surfaces between the pair of surfaces while the engine and the vehicle are stationary means that the damping member does not act on stiffness of the vehicle body frame as springs in series. Accordingly, in the vibration damping apparatus according to the present invention, the damping member functions as springs in parallel, which makes it easy to achieve stiffness of the vehicle body frame structure including the engine even if an elastic member having a low stiffness is used.

In addition, the vibration damping apparatus according to the present invention can be configured by disposing, in the space between the vehicle body frame and the engine, at least the pair of mutually facing surfaces that are not to be relatively displaced while the engine and the vehicle are stationary and are to be relatively displaced while the vehicle is running or the vehicle is running and, in the space between the pair of surfaces, the damping member which is fixed to each of the surfaces and to which no load is applied while the engine and the vehicle are stationary. The structure can therefore be simplified and a degree of freedom in disposition is improved.

Specifically, the vibration damping apparatus according to the present invention achieves effects of stiffness of the vehicle body frame being easily achieved, a simplified structure, and an improved degree of freedom in disposition. Moreover, an effective damping effect can be achieved when vibration does occur.

Additionally, the damping member includes the sheet-like high-damping rubber on which a shearing force acts in a relative parallel displacement between each of the surfaces. In addition to the sheet-like damping member formed of the high-damping rubber, the shearing force acts between wide surfaces in the sheet-like high-damping rubber, so that an effective damping effect can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of a vibration damping apparatus for a saddle riding type vehicle according to the present invention will be described below with reference to the accompanying drawings.

Figure 1:
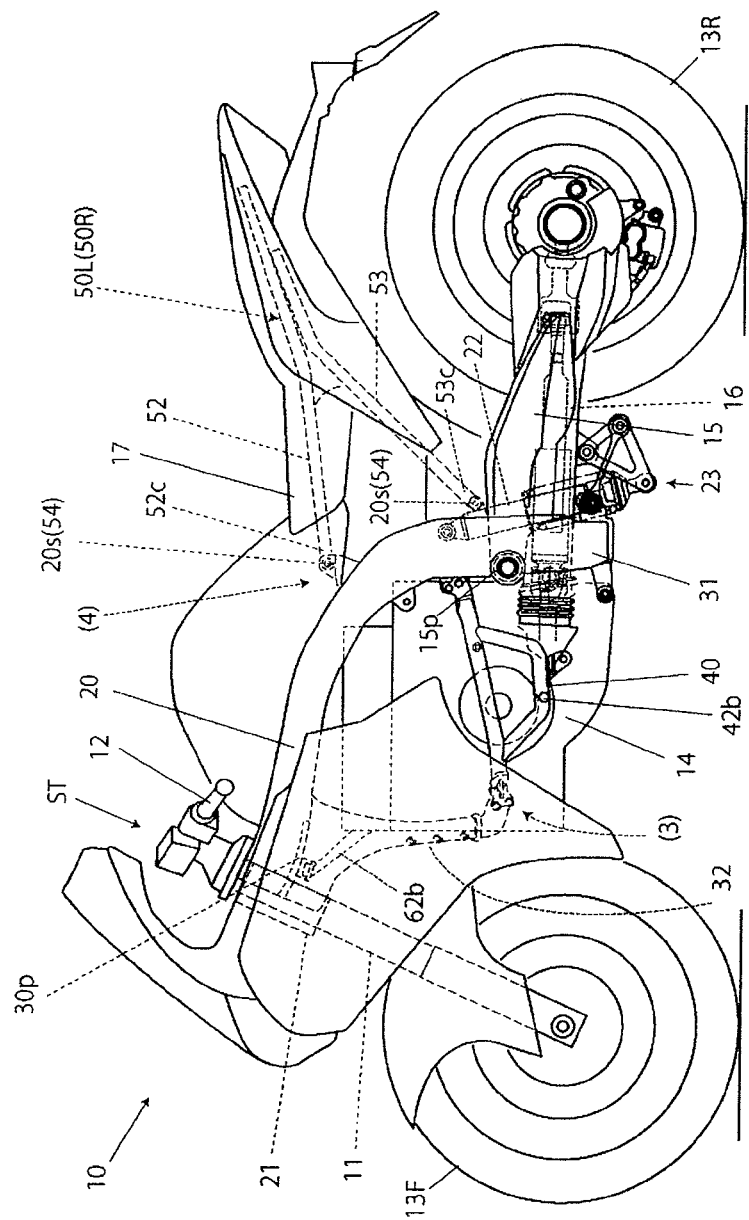
FIG. 1 is a left side elevational view showing a motorcycle as an example of a saddle riding type vehicle, to which an embodiment of a vibration damping apparatus for a saddle riding type vehicle according to the present invention is applied.

FIG. 1 is a left side elevational view showing a motorcycle as an example of a saddle riding type vehicle, to which an embodiment of a vibration damping apparatus for a saddle riding type vehicle according to the present invention is applied.

A motorcycle 10 includes a frame forming a vehicle body (vehicle body frame) 20 and an engine 14 mounted thereon. A steering system ST is rotatably mounted on a head pipe 21 that forms a front end of the vehicle body frame 20. The steering system ST includes a front fork 11 and a handlebar 12 disposed on an upper portion of the front fork 11. A front wheel 13F is rotatably mounted on a lower end of the front fork 11. A swing arm 15 is vertically swingably mounted on a pivot shaft 15p at a rear portion of the vehicle body frame 20. A rear wheel 13R as a drive wheel is rotatably mounted at a rear end portion of the swing arm 15. The rear wheel 13R is driven via a drive shaft 16 disposed between the rear wheel 13R and the engine 14.

Figure 2:
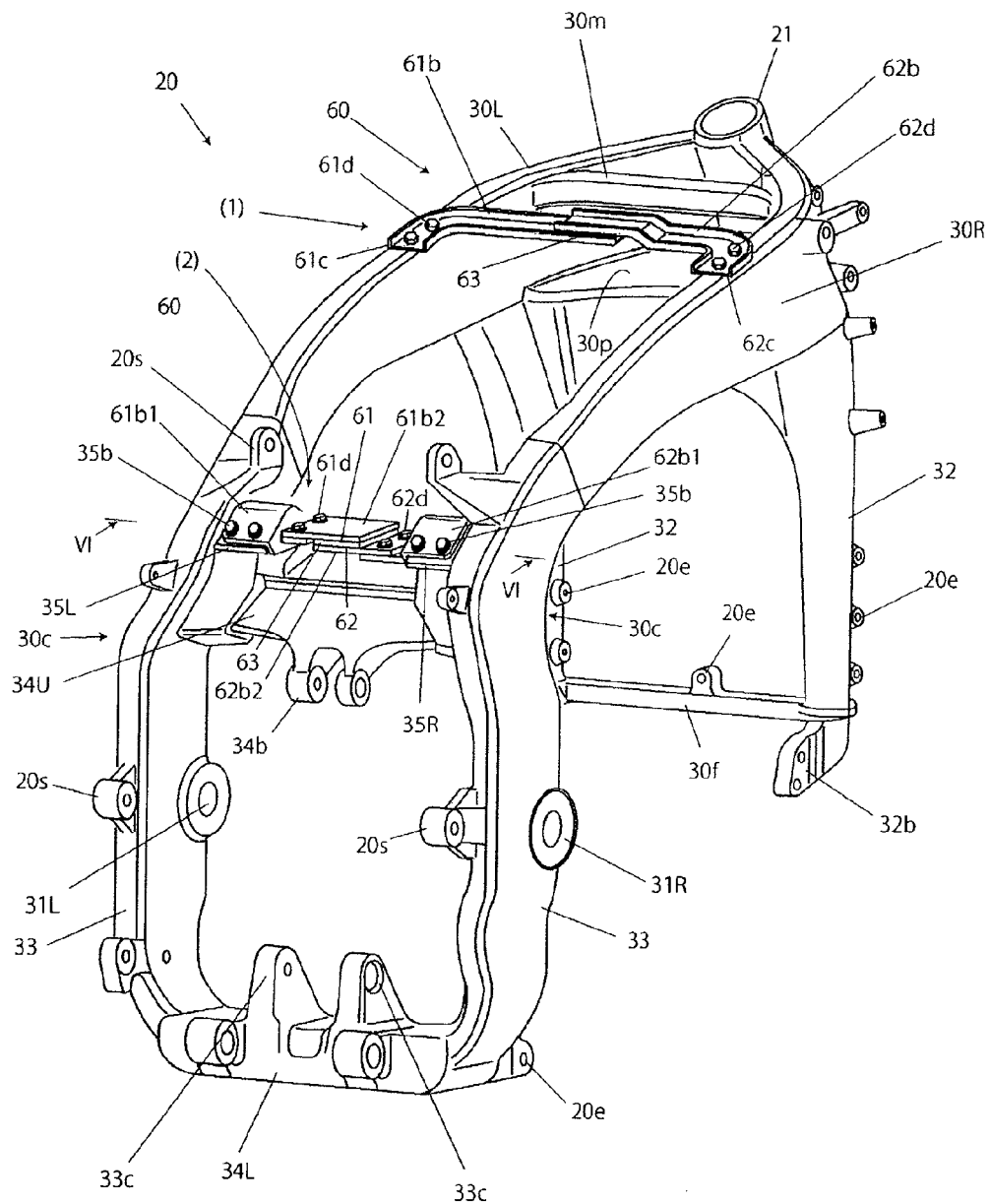
FIG. 2 is a perspective view showing a main section of a vehicle body frame 20 as viewed from an obliquely rearward direction.
Figure 3:
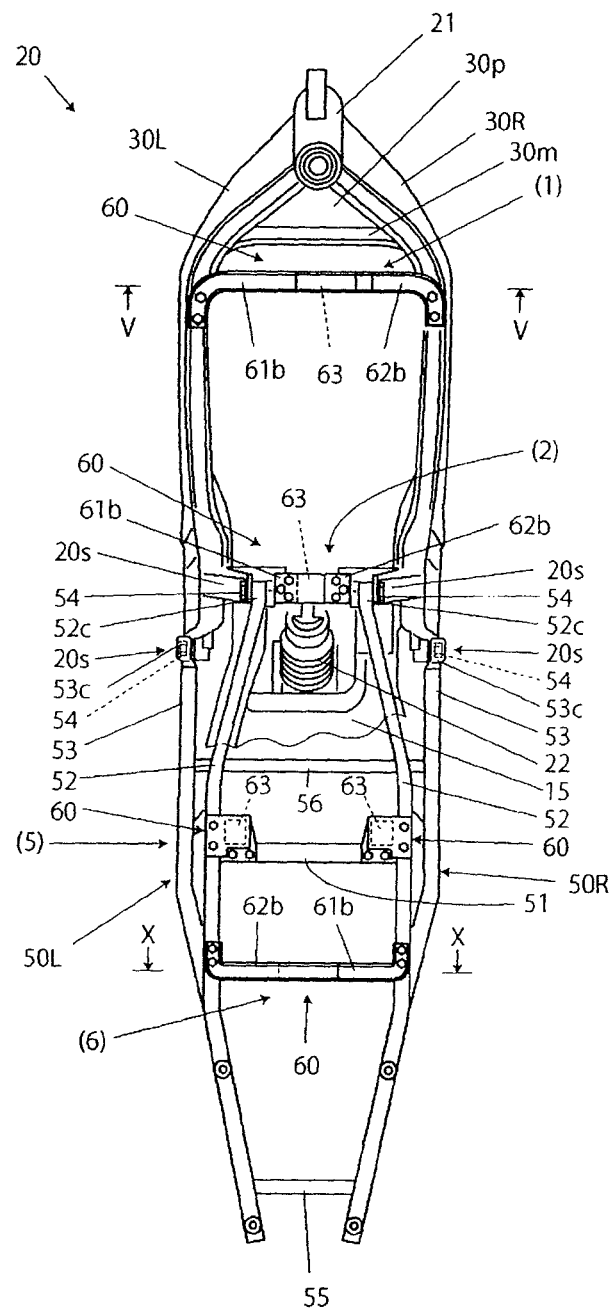
FIG. 3 is a plan view showing the vehicle body frame 20.

FIG. 2 is a perspective view showing a main section of the vehicle body frame 20 as viewed from an obliquely rearward direction. FIG. 3 is a plan view showing the vehicle body frame 20.

Referring to FIGS. 1 to 3, the vehicle body frame 20 includes a pair of main frames 30L, 30R that integrally extend from the head pipe 21 rearwardly to the left and right and are disposed on respective sides of the vehicle body.

The left and right main frames 30L, 30R include swing arm support portions 31L, 31R disposed integrally at rear portions thereof. The swing arm support portions 31L, 31R support the swing arm 15 vertically swingably.

The main frames 30L, 30R include front-side engine hanger portions 32, 32 disposed integrally at front portions thereof. The front-side engine hanger portions 32, 32 droop down at a front portion of the engine 14, to which the front portion of the engine 14 is fixed. In addition, the main frames 30L, 30R include rear-side engine hanger portions 33, 33 disposed integrally at rear portions thereof. The rear-side engine hanger portions 33, 33 droop down at a rear portion of the engine 14, to which the rear portion of the engine 14 is fixed. The swing arm support portions 31L, 31R are formed with the rear-side engine hanger portions 33, 33. Referring to FIG. 1, the front-side engine hanger portions 32 and the rear-side engine hanger portions 33 are connected with a sub-frame 40.

Referring to FIGS. 1 and 3, the vehicle body frame 20 includes a pair of left and right seat rails 50L, 50R and a seat rail connecting portion 51. Specifically, the seat rails 50L, 50R extend rearwardly from the main frames 30L, 30R to support a seat 17 on which an occupant sits. The seat rail connecting portion 51 connects the seat rails 50L, 50R.

The head pipe 21, the pair of left and right main frames 30L, 30R, the swing arm support portions 31L, 31R, the front-side engine hanger portions 32, 32, and the rear-side engine hanger portions 33, 33 can be formed with a diamond frame made of an aluminum alloy. In this embodiment, the engine 14 is disposed in the diamond frame and suspended by the engine hanger portions 32, 33. Referring to FIG. 2, reference numeral 20e denotes a mounting portion of the engine 14.

The swing arm 15 and the vehicle body frame 20 are connected via a well-known cushion unit 22 and a well-known linkage mechanism 23. The cushion unit 22 has an upper end mounted rotatably at a support portion 34b disposed in an upper cross member 34U (FIG. 2) and a lower end connected to the linkage mechanism 23. The linkage mechanism 23 has a first end connected rotatably to a support portion 33c disposed in a lower cross member 34L that integrally connects lower portions of the rear-side engine hanger portions 33. In FIG. 2, reference numeral 20s denotes mounting portions of the seat rails 50L, 50R (FIGS. 1 and 3).

The vibration damping apparatus of this embodiment can be disposed at an appropriate position in, for example, the vehicle body frame 20 having the arrangements as described above.

Figures 4A, 4B:
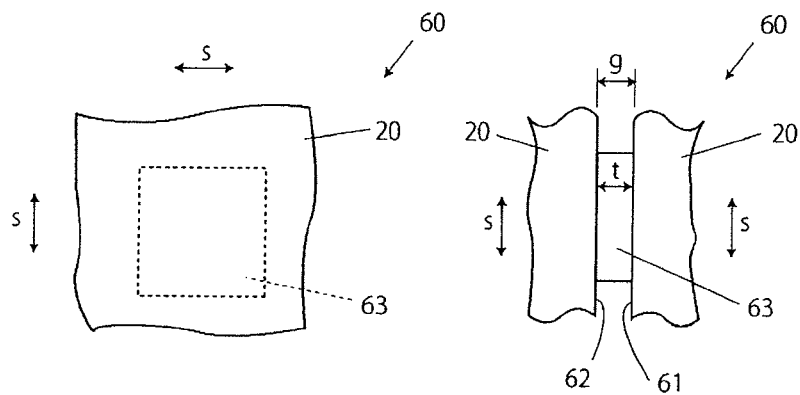
FIGS. 4(a), 4(b), 4(c), 4(d), 4(e), and 4(f) are schematic views showing a basic configuration of the vibration damping apparatus of the embodiment, FIG. 4(a) being a front elevational view of one mode of the basic configuration, FIG. 4(b) being a side elevational view thereof, FIG. 4(c) being a front elevational view of another mode of the basic configuration, FIG. 4(d) being a side elevational view thereof, FIG. 4(e) being a front elevational view of still another mode of the basic configuration, and FIG. 4(f) being a side elevational view thereof.
Figures 4C, 4D:
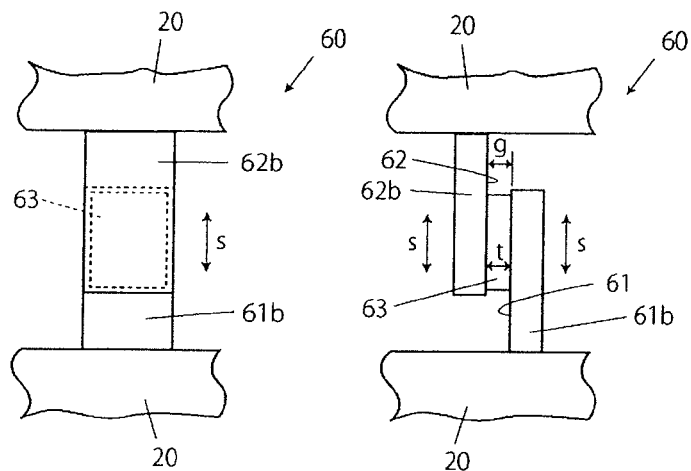
Figures 4E, 4F:
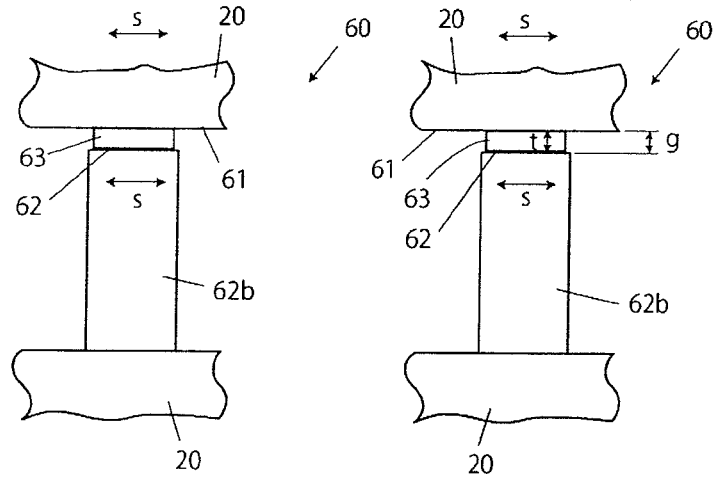

FIGS. 4(a), 4(b), 4(c), 4(d), 4(e), and 4(f) are schematic views showing a basic configuration of the vibration damping apparatus according to the embodiment. FIG. 4(a) is a front elevational view showing one mode of the basic configuration. FIG. 4(b) is a side elevational view showing the one mode of the basic configuration. FIG. 4(c) is a front elevational view showing another mode of the basic configuration. FIG. 4(d) is a side elevational view showing the another mode of the basic configuration. FIG. 4(e) is a front elevational view showing still another mode of the basic configuration. FIG. 4(f) is a side elevational view showing the still another mode of the basic configuration.

As shown in the drawings, a vibration damping apparatus 60 according to the embodiment has a basic configuration, in which the vehicle body frame 20 includes a damping member 63 which is disposed between at least a pair of mutually facing surfaces 61, 62 and fixed to each of the surfaces 61, 62. Specifically, the surfaces 61, 62 are not to be relatively displaced while the motorcycle 10 is stationary and are to be relatively displaced while the motorcycle 10 is running. No load is applied to the damping member 63 while the motorcycle 10 is stationary.

An arrangement, in which a spacing g between the surfaces 61, 62 while the motorcycle 10 is stationary is made equal to (engineered to be equal to) a thickness t of the damping member 63 in a free state, allows no load (in this case, a compressive force or a tensile force) to be applied to the damping member 63 while the motorcycle 10 is stationary.

An arrangement, in which relative movement in a direction in parallel with the surfaces 61, 62 (direction of an arrow s in FIG. 4) does not occur between the surfaces 61, 62 while the damping member 63 is fixed to the surfaces 61, 62 and the motorcycle 10 is stationary, allows no load (in this case, a shearing force or a torsional force) to be applied to the damping member 63 while the motorcycle 10 is stationary.

Specifically, load (a compressive force, a tensile force, a shearing force, and a torsional force) can be prevented from being applied to the damping member 63 while the motorcycle 10 is stationary by making the spacing g between the surfaces 61, 62 while the motorcycle 10 is stationary equal to the thickness t of the damping member 63 in a free state and preventing relative movement between the surfaces 61, 62 in the direction s parallel with the surfaces 61, 62 while the damping member 63 is fixed to the surfaces 61, 62 and the motorcycle 10 is stationary.

Well-known means (e.g. adhesion using an adhesive and cure adhesion) may be used for fixing the damping member 63 to the surfaces 61, 62.

The surfaces 61, 62 may be formed with, for example, side surfaces of the vehicle body frame 20 itself as shown in FIGS. 4(a) and 4(b), or with, for example, side surfaces of members 61b, 62b disposed integrally with the vehicle body frame 20 as shown in FIGS. 4(c) and 4(d). Alternatively, as shown in FIGS. 4(e) and 4(f), a first surface of the surfaces 61, 62 (e.g. the surface 61) may be formed with a surface of for example, a side surface of the vehicle body frame 20 and a second surface of the surfaces 61, 62 (e.g. the surface 62) may be formed with, for example, an upper surface of a member (e.g. the member 62b) disposed integrally with the vehicle body frame 20.

In the vibration damping apparatus 60 for the motorcycle 10 as described above, the damping member 63 is fixed, between at least a pair of mutually facing surfaces 61, 62 that are relatively displaceable while the motorcycle 10 is running, to each of the surfaces 61, 62 in the vehicle body frame 20. Should vibration causing the pair of surfaces 61, 62 to be relatively displaced occur as a result of running of the motorcycle 10, therefore, the vibration is damped by the damping member 63. Specifically, a vibration damping effect of the vehicle body frame 20 can be produced.

While the motorcycle 10 is stationary, the pair of surfaces 61, 62 is not relatively displaced and no load is applied to the damping member 63 fixed to each of the surfaces 61, 62 between the pair of surfaces 61, 62 while the motorcycle 10 is stationary. If vibration that causes the pair of surfaces 61, 62 to be relatively displaced occurs, therefore, load (dynamic load) acts on the damping member 63, so that the vibration can be effectively damped by the damping member 63. Specifically, assuming that load initially acts on the damping member 63 even while the motorcycle 10 is stationary, a damping capacity which the damping member 63 innately possesses is impaired for the load, so that the damping effect is reduced when the load (dynamic load) acts on the damping member 63. In this embodiment, however, because of no initial load acting on the damping member 63, an effective damping effect can be achieved when the vibration occurs.

The fact that no load is applied to the damping member 63 fixed to each of the surfaces 61, 62 between the pair of surfaces 61, 62 while the motorcycle 10 is stationary means that the damping member 63 does not act on stiffness of the vehicle body frame 20 as springs in series. Accordingly, in the vibration damping apparatus 60, the damping member 63 functions as springs in parallel, which makes it easy to achieve stiffness of the vehicle body frame 20 even if an elastic member having a low stiffness is used.

In addition, the vibration damping apparatus 60 can be configured by disposing, in the vehicle body frame 20, at least the pair of mutually facing surfaces 61, 62 that are not to be relatively displaced while the motorcycle 10 is stationary and are to be relatively displaced while the motorcycle 10 is running and, in the space between the pair of surfaces 61, 62, the damping member 63 which is fixed to each of the surfaces 61, 62 and to which no load is applied while the motorcycle 10 is stationary. The structure can therefore be simplified and improves a degree of freedom in disposition.

Preferably, the damping member 63 is formed of a sheet-like high-damping rubber on which a shearing force acts in a relative parallel displacement (relative movement in the direction of the arrow s in FIG. 4) between each of the surfaces 61, 62.

Through the foregoing arrangement, the sheet-like damping member 63 is formed of the high-damping rubber and, in addition, the shearing force acts between wide surfaces in the high-damping rubber, so that an effective damping effect can be achieved.

The vibration damping apparatus 60 as described heretofore may be disposed at, for example, locations to be described hereunder. Disposed conditions thereof will be described below as disposition examples. The disposed locations (disposition examples) given hereunder with parenthesized numbers are shown with parenthesized numbers as appropriately also in FIGS. 1 to 3. In addition, in the disposition examples to be described hereunder, like portions or members as those found in the above-described basic configuration are identified by like reference numerals. The vibration damping apparatus 60 may be disposed at all locations, one location, or any multiple locations, of the disposed locations to be described as the Disposition Examples below.

Disposition Example (1)

Figure 5:
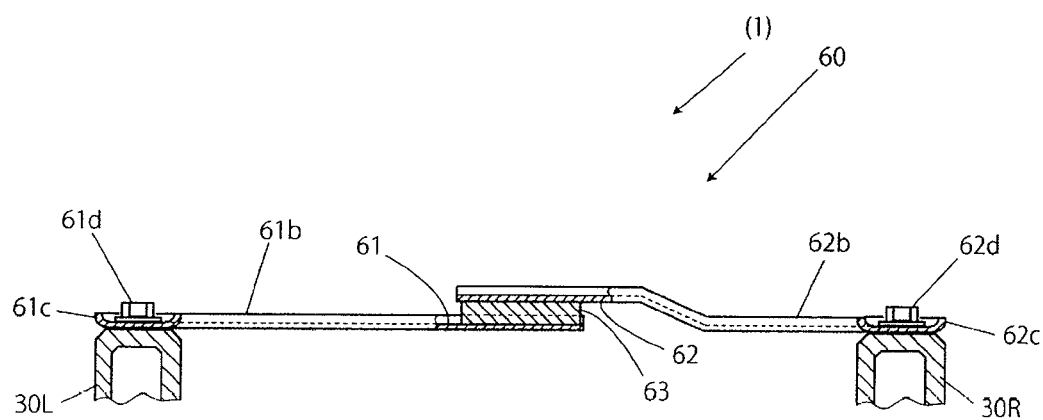
FIG. 5 is a partly omitted, enlarged cross-sectional view taken along V-V of FIG. 3.

See FIGS. 2, 3, and 5

The vibration damping apparatus 60 may be disposed between the pair of left and right main frames 30L, 30R in the vehicle body frame 20 (see FIGS. 2, 3, and 5).

FIG. 5 is a partly omitted, enlarged cross-sectional view taken along V-V of FIG. 3.

Referring to FIG. 5, the vibration damping apparatus 60 can be formed as follows. Specifically, the surface 61 of the pair of surfaces 61, 62 is disposed on the side of a first main frame (the left main frame 30L in the example shown in FIG. 5) of the pair of left and right main frames 30L, 30R and the other surface 62 is disposed on the side of a second main frame (the right main frame 30R in the example shown in FIG. 5). The damping member 63 which is fixed to each of the surfaces 61, 62 and to which no load is applied while the motorcycle 10 is stationary is then disposed between the pair of surfaces 61, 62.

The surface 61 can be formed with an upper surface of a member 61b having a U-shaped cross section and having a base 61c integrally secured to the left main frame 30L with a bolt 61d. The surface 62 can be formed with a lower surface of a member 62b having a U-shaped cross section and having a base 62c integrally secured to the right main frame 30R with a bolt 62d.

Referring to FIG. 2, stiffness of the vehicle body frame 20 is maintained by the pair of left and right main frames 30L, 30R that are arranged as detailed below: specifically, upper portions are integrally connected together with a cross member 30m at a position immediately rearward of the head pipe 21; lower portions are integrally connected together with a connecting plate 30p at a position immediately rearwardly of the head pipe 21; bent portions 30c that are continuous with rear portion droop-down portions are connected integrally together with the upper cross member 34U; the droop-down portions have their lower ends connected integrally together with the lower cross member 34L; and the front-side engine hanger portions 32 have their lower ends connected together with a front cross member 30f.

Therefore, load can be prevented from being applied between the members 61b, 62b (to prevent the members 61b, 62b and the damping member 63 from bearing load) while the vehicle is stationary.

The pair of left and right main frames 30L, 30R disposed on the vehicle body frame 20 enhances stiffness of the vehicle body frame 20. If the vehicle body frame 20 includes the left and right main frames, however, vibration unique to each of the left and right main frames 30L, 30R can be produced while the motorcycle 10 is running.

By disposing the first surface 61 on the side of a first main frame (e.g. the left main frame 30L) of the pair of left and right main frames 30L, 30R and the second surface 62 on the side of a second main frame (e.g. the right main frame 30R), the vibration produced in each of the left and right main frames 30L, 30R can be effectively damped.

More specifically, the vehicle body frame 20 has vibration modes including a number of modes in which the left and right main frames 30L, 30R are deformed, such as a weave mode.

If, of the deformation modes, a mode that causes the main frames 30L, 30R to be deformed laterally (yaw-direction deformation mode) or one that causes the main frames 30L, 30R to be twisted laterally (roll-direction deformation mode) occurs, the left and right main frames 30L, 30R vibrate alternately to vary a distance therebetween.

In the disposition example, the above-described arrangement causes the damping member 63 to be deformed in the shearing direction when the left and right main frames 30L, 30R vibrate in the abovementioned mode.

As a result, vibration of the vehicle body frame 20 is effectively damped.

The weave mode is one of vibration phenomena unique to a running motorcycle, developing a complicated movement (vibration mode) that combines a lateral movement, a yaw movement, and a roll movement. The weave mode has a frequency of 1 to 4 Hz, with the intensity of vibration increasing as vehicle speed increases. When the weave mode occurs, the vibration of the abovementioned mode occurs in the left and right main frames 30L, 30R, so that the disposition example allows vibration in the weave mode to be converged quickly.

Additionally, in the disposition example, the vibration damping apparatus 60 is disposed at a position closer to the head pipe 21 relative to the longitudinal direction of the main frames 30L, 30R. Vibration transmitted from the front wheel 13F to the left and right main frames 30L, 30R via the steering system ST and the head pipe 21 can therefore be effectively damped.

(2) Disposition Example (2)

Figure 6:
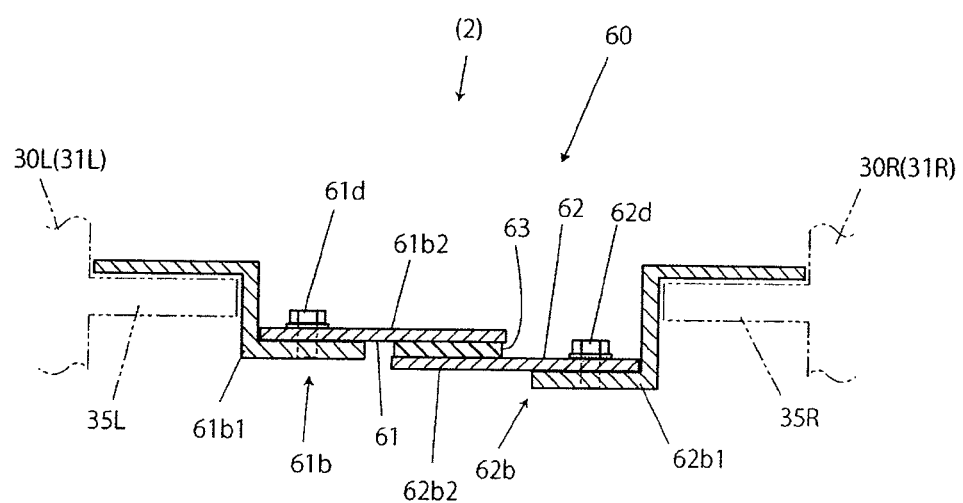
FIG. 6 is a partly omitted, enlarged cross-sectional view taken along VI-VI of FIG. 2.

See FIGS. 2 and 6

The vibration damping apparatus 60 may be disposed between the pair of left and right swing arm support portions 31L, 31R disposed rearwardly of the left and right main frames 30L, 30R (see FIGS. 2 and 6).

FIG. 6 is a partly omitted, enlarged cross-sectional view taken along VI-VI of FIG. 2.

Referring to FIGS. 2 and 6, the vibration damping apparatus 60 can be formed as follows. Specifically, the surface 61 of the pair of surfaces 61, 62 is disposed on the side of a first swing aim support portion (the left swing arm support portion 31L in the example shown in FIG. 2) of the pair of left and right swing arm support portions 31L, 31R (which are also the left and right main frames 30L, 30R) and the other surface 62 is disposed on the side of a second swing arm support portion (the right swing arm support portion 31R in the example shown in FIG. 2). The damping member 63 which is fixed to each of the surfaces 61, 62 and to which no load is applied while the motorcycle 10 is stationary is then disposed between the pair of surfaces 61, 62.

The surface 61 can be formed with a lower surface of a member 61b and the surface 62 can be formed with an upper surface of a member 62b.

The member 61b can be formed of a first member 61b1 and a flat sheet-like second member 61b2 that is integrally fixed to the first member 61b1 with a bolt 61d. The surface 61 can be formed with a lower surface of the second member 61b2.

The first member 61b1 is integrally fixed to a mounting portion 35L with a bolt 35b (FIG. 2). More specifically, the mounting portion 35L is a protruding (sheet-like) tab that is integrally disposed inwardly from an inner surface of the left swing arm support portion 31L (which is also the left main frame 30L) at an upper portion of the upper cross member 34U that includes the support portion 34b for supporting the upper end of the cushion unit 22.

The member 62b can be formed of a first member 62b1 and a flat sheet-like second member 62b2 that is integrally fixed to the first member 62b1 with a bolt 62d. The surface 62 can be formed with an upper surface of the second member 62b2.

The first member 62b1 is integrally fixed to a mounting portion 35R with a bolt 35b. More specifically, the mounting portion 35R is a protruding (sheet-like) tab that is integrally disposed inwardly from an inner surface of the right swing arm support portion 31R (which is also the right main frame 30R) at the upper portion of the upper cross member 34U.

The vehicle body frame 20 has a stiffness retention structure as described above, which allows load to be prevented from being applied between the member 61b and the member 62b while the vehicle is stationary.

The vibration damping apparatus 60 according to the disposition example allows vibration that tends to occur alternately in the left and right swing anti support portions 31L, 31R to be effectively damped.

More specifically, when, for example, vibration occurs combining mainly yawing and rolling as in the abovementioned weave mode, the left and right swing arm support portions 31L, 31R in the vehicle body frame 20 vibrate alternately in the longitudinal direction.

The damping member 63 is sandwiched between the flat sheet-like second members 61b2, 62b2 such that such a movement causes a force in the shearing direction to act on the damping member 63, which effectively damps the combined vibration.

Effect of improved converging performance of the vibration in the weave mode could be confirmed in the following arrangements: specifically, the vehicle body frame 20 was formed of the diamond frame made of an aluminum alloy mentioned earlier and disposition example (2) was employed; a damping force produced when vibration of an amplitude of 0.1 mm, fluctuating load+−200 N, and a frequency of 3 Hz is applied in the shearing direction to the damping member 63 formed of a high-damping rubber is set to about 100 N.

(3) Disposition Example (3)

Figure 7A:
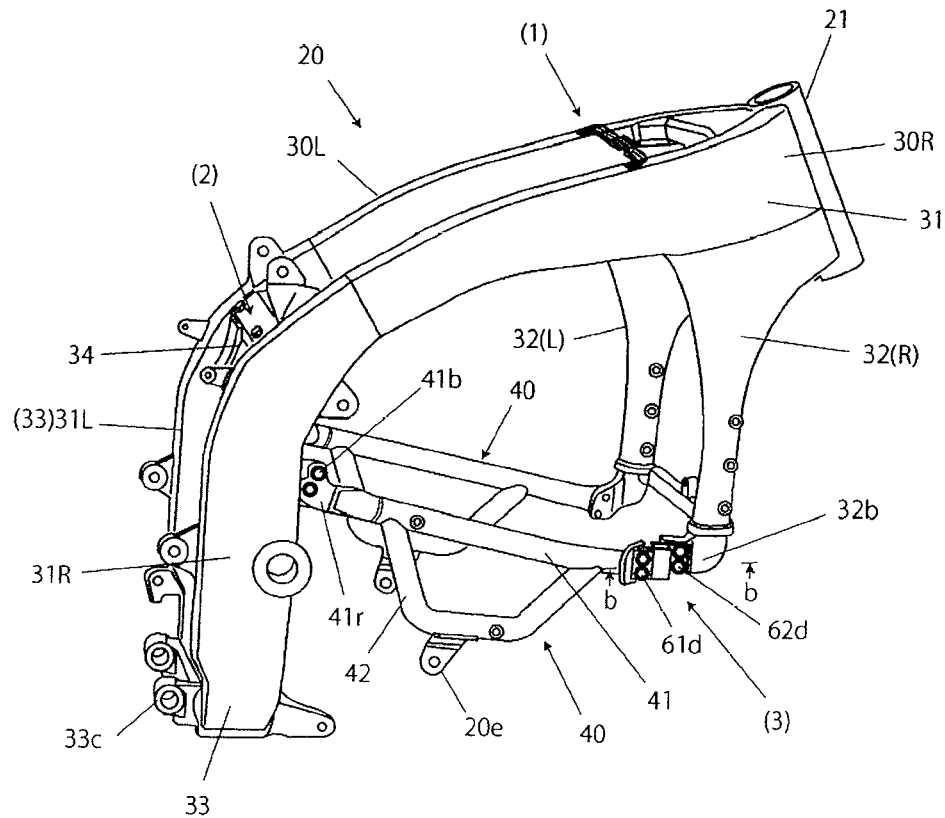
FIG. 7(a) is a perspective view showing a condition in which a front-side engine hanger portion 32 and a rear-side engine hanger portion 33 are connected with a sub-frame 40 and FIG. 7(b) is a partly omitted, enlarged cross-sectional view taken along b-b of FIG. 7(a)
Figure 7B:
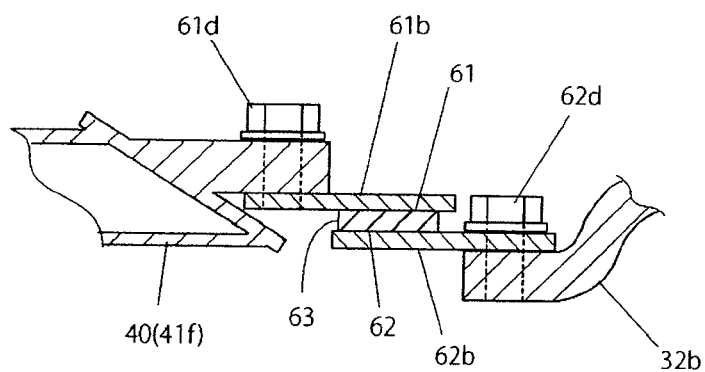

See FIGS. 1, and 7

The vibration damping apparatus 60 may be disposed between the sub-frame 40 and the front-side engine hanger portion 32 and/or the rear-side engine hanger portion 33 (see FIGS. 1, and 7).

FIG. 7 is views showing a condition in which the front-side engine hanger portions 32 and the rear-side engine hanger portions 33 are connected with the sub-frame 40, FIG. 7(a) being a perspective view and 7(b) being a partly omitted, enlarged cross-sectional view taken along b-b of FIG. 7(a).

Referring to FIG. 7, the vibration damping apparatus 60 can be formed as follows. Specifically, the surface 61 of the pair of surfaces 61, 62 is disposed on the side of the sub-frame 40 and the other surface 62 is disposed on the side of the front-side engine hanger portion 32. The damping member 63 which is fixed to each of the surfaces 61, 62 and to which no load is applied while the motorcycle 10 is stationary and the engine 14 is stationary is then disposed between the pair of surfaces 61, 62. In the same manner, the vibration damping apparatus 60 may be configured between the sub-frame 40 and the rear-side engine hanger portion 33. The vibration damping apparatus 60 may also be disposed between either one of the sub-frames 40 and either one of the engine hanger portions or between both sub-frames 40 and both engine hanger portions.

The surface 61 can be formed with an inner surface (the surface on the inside in a vehicle width direction) of a member 61b, while the surface 62 can be formed with an outer surface of a member 62b.

The member 61b can be formed with a flat sheet-like member that is fixed integrally to a leading end (41f) of the sub-frame 40 with a bolt 61d. The member 62b can be formed with a flat sheet-like member that is fixed integrally to a lower end 32b of the front-side engine hanger portion 32 with a bolt 62d.

The sub-frame 40 includes a connecting frame 41 extending in the longitudinal direction and a droop-down frame 42 that droops down into a U-shape integrally from the connecting frame 41. The connecting frame 41 has a first end (a rear end 41r in the drawing) fastened to the rear-side engine hanger portion 33 with a bolt 41b. The droop-down frame 42 has a fixing portion 20e disposed at a lower portion thereof fastened to the engine 14 with a bolt 42b (FIG. 1). The connecting frame 41 has a second end (a front end 41f in the drawing) not fastened to the front-side engine hanger portion 32; instead, the vibration damping apparatus 60 described above is inserted between the second end and the front-side engine hanger portion 32.

Accordingly, the sub-frame 40 does not function to reinforce the vehicle body frame 20, but part of sub-frame 40 (the droop-down frame 42 in the drawing) is fixed to the engine 14 and the vibration damping apparatus 60 is disposed between the sub-frame 40 and the engine hanger portion 32 and/or 33. Thus, vibration generated from the engine 14 can be effectively damped by the effect of the vibration damping apparatus 60.

(4) Disposition Example (4)

See FIGS. 1, and 8

The vibration damping apparatus 60 may be disposed between the main frame (the pair of left and right main frames 30L, 30R in the drawing) and the seat rail (the pair of left and right seat rails 50L, 50R) (see FIGS. 1, and 8). The vibration damping apparatus 60 may be disposed on both of the left and right seat rails 50L, 50R as shown in the drawing or only between either one of the seat rails 50L, 50R and either one of the main frames 30L, 30R.

Figure 8A:
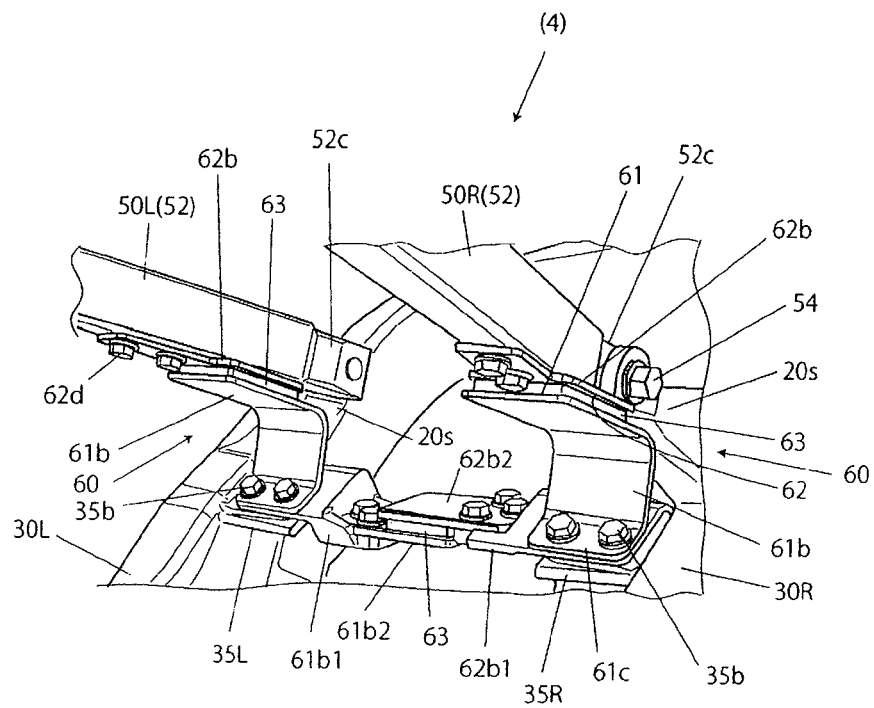
FIGS. 8(a) and 8(b) are views showing a connection between main frames (30L, 30R) and seat rails (50L, 50R), FIG. 8(a) being a perspective view showing the connection as viewed from an obliquely rearward direction and FIG. 8(b) being a partly omitted, side-elevational view taken of FIG. 8(a)
Figure 8B:
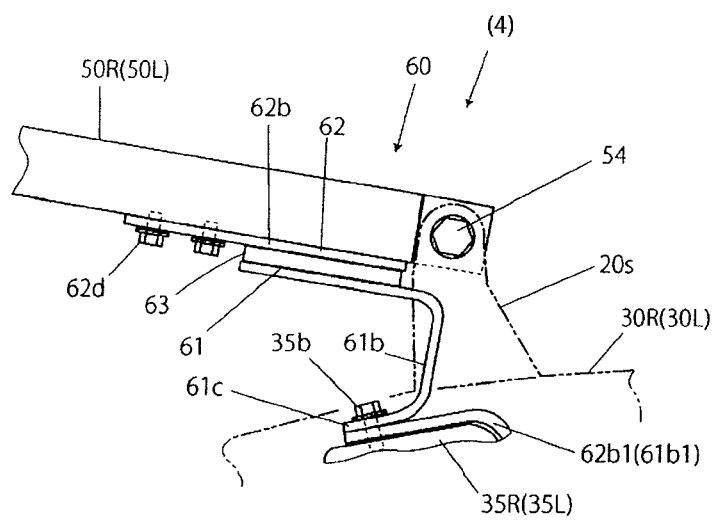

FIG. 8 is views showing a connection between main frames (30L, 30R) and seat rails (50L, 50R), FIG. 8(a) being a perspective view showing the connection as viewed from an obliquely rearward direction and FIG. 8(b) being a partly omitted, side-elevational view taken of FIG. 8(a).

Referring to FIG. 8, the vibration damping apparatus 60 can be formed as follows. Specifically, the surface 61 of the pair of surfaces 61, 62 is disposed on the side of the main frame (30L, 30R) and the other surface 62 is disposed on the side of the seat rail (50L, 50R). The damping member 63 which is fixed to each of the surfaces 61, 62 and to which no load is applied while the motorcycle 10 is stationary is then disposed between the pair of surfaces 61, 62.

The surface 61 can be formed with an upper surface (the surface facing the seat rail) of a member 61b having a C-shape in a side view and having a base 61c integrally secured to the main frame (30L, 30R) with a bolt 35b. The surface 62 can be formed with a lower surface (the surface facing the main frame) of a flat sheet-like member 62b integrally secured to a lower surface of the seat rail (50L, 50R) with a bolt 62d. The surface 62 may also be formed with the lower surface of the seat rail (50L, 50R) without having the member 62b. Note that, as shown in FIG. 8, the member 61b may be jointly fastened with the member 61b1 or 62b1 in deposition example (1) described earlier to the mounting portion 35 (L, R) in the main frame (30L, 30R) using the bolt 61d.

Referring to FIG. 1, the seat rail (50L, 50R) is a Y-shaped member in a side view having a bifurcated front portion. Bifurcated portions 52, 53 have leading ends 52c, 53c fastened and fixed to the mounting portions 20s in the main frame (30L, 30R) with bolts 54 (see FIG. 8), respectively.

Consequently, a force acting on the seat rail (50L, 50R) while the motorcycle 10 is stationary is borne by the mounting portions 20s, so that no external force acts between the members 61b, 62b, specifically, on the damping member 63.

In the disposition example, vibration produced in the seat rail (50L, 50R) and the main frame (30L, 30R) with the weight of the occupant borne thereby can be effectively damped.

The seat rail holds a good part of the weight of the occupant and the weight of a load loaded in the vehicle.

Accordingly, a vibration mode occurs in the seat rail when the vehicle runs, vibrating the seat rail in the vehicle width direction with the above weight (e.g. the weight of the occupant) applied thereto. The vibration mode includes vibration of the main frame to which the seat rail is connected, combined therewith.

The disposition example includes the thin sheet-like damping member 63 extending in the vehicle width direction, which effectively damps vibration that vibrates the seat rail (50L, 50R) in the vehicle width direction relative to the main frame (30L, 30R).

(5) Disposition Example (5)

Figure 9:
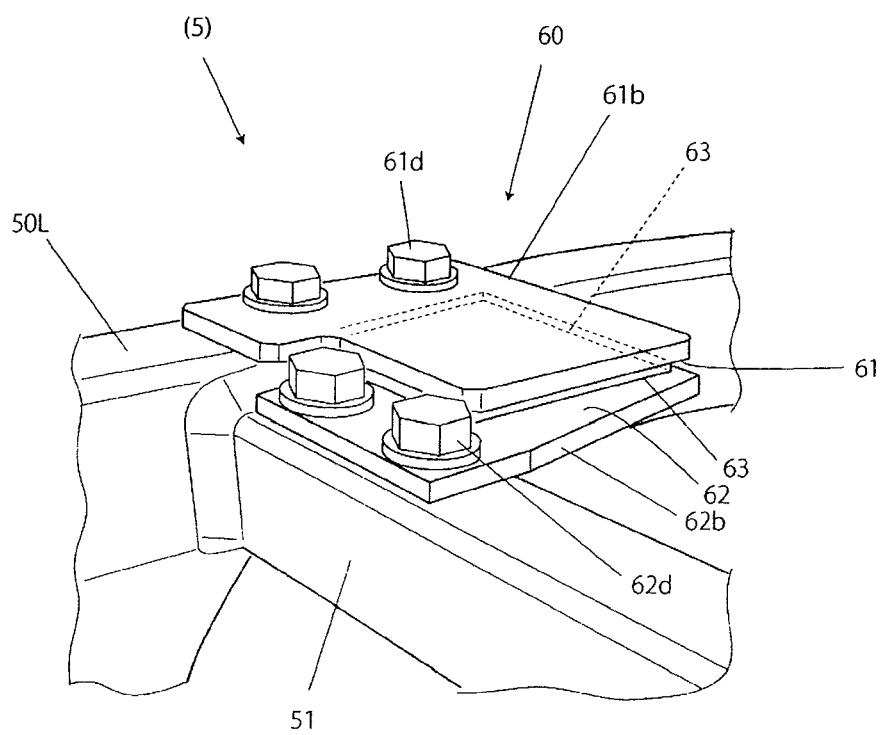
FIG. 9 is a perspective view showing the connection between a seat rail 50L on one side and a seat rail connecting portion 51.

See FIGS. 3 and 9

The vibration damping apparatus 60 may be disposed between the seat rail (50L, 50R) and the seat rail connecting portion 51. The vibration damping apparatus 60 may be disposed between each of the left and right seat rails 50L, 50R and the seat rail connecting portion 51 as shown in FIG. 3 or only between either one of the seat rails 50L, 50R and the seat rail connecting portion 51.

FIG. 9 is a perspective view showing the connection between the seat rail 50L on one side and the seat rail connecting portion 51.

Referring to FIG. 9, the vibration damping apparatus 60 can be foamed as follows. Specifically, the surface 61 of the pair of surfaces 61, 62 is disposed on the side of the seat rail 50L and the other surface 62 is disposed on the side of the seat rail connecting portion 51. The damping member 63 which is fixed to each of the surfaces 61, 62 and to which no load is applied while the motorcycle 10 is stationary is then disposed between the pair of surfaces 61, 62.

The surface 61 can be formed with a lower surface of a flat sheet-like member 61b having a base 61c integrally secured to the seat rail 50L with a bolt 61d. The surface 62 can be formed with an upper surface of a flat sheet-like member 62b integrally secured to an upper surface of the seat rail connecting portion 51 with a bolt 62d. The surface 62 may also be formed with the upper surface of the seat rail connecting portion 51 without having the member 62b.

Referring to FIG. 3, the left and right seat rails 50L, 50R have longitudinally intermediate portions integrally connected together with the seat rail connecting portion 51 and longitudinally rear portions integrally connected together with a rear portion connecting portion 55. In addition, the left and right seat rails 50L, 50R have their bifurcated portions 53 connected together with a lower portion connecting portion 56. Stiffness of the left and right seat rails 50L, 50R is thereby achieved. As described earlier, the bifurcated portions 52, 53 have the leading ends 52c, 53c fastened and fixed to the mounting portions 20s in the main frame (30L, 30R) with the bolts 54. This achieves stiffness of the vehicle body frame 20 as a whole.

Load can thereby be prevented from being applied between the members 61b, 62b while the motorcycle 10 is stationary.

In the disposition example, stiffness of the entire seat rail can be improved by the seat rail connecting portion 51 and vibration produced in the seat rails can be effectively damped.

As described earlier, the seat rail holds a good part of the weight of the occupant and the weight of the load loaded in the vehicle.

The load of the vehicle is variable, so that it is difficult to control, with the stiffness of the vehicle body frame 20, vibrational eigenvalues and modes of states with varying masses applied thereto.

In general, the structure must ensure to achieve strength and stiffness in the vertical (gravitational) direction of the seat rail. In the vehicle width direction of the seat rail, on the other hand, it is desirable that combined vibration with the main frame should be avoided by keeping stiffness low.

Consequently, when the vehicle runs at high speeds, in particular, when the vehicle runs at high speeds with a load loaded on a rear end of the seat rails, the vibrational eigenvalue of the seat rail in the vehicle width direction and its mode vary greatly depending on the vehicle speed and the loaded condition.

In contrast, the disposition example includes the thin sheet-like damping member 63 extending in the vehicle width direction, disposed between the seat rail and the seat rail connecting portion 51, which effectively damps vibration that vibrates the seat rail, or a rear end thereof, in particular, in the vehicle width direction.

(6) Disposition Example (6)

Figure 10:
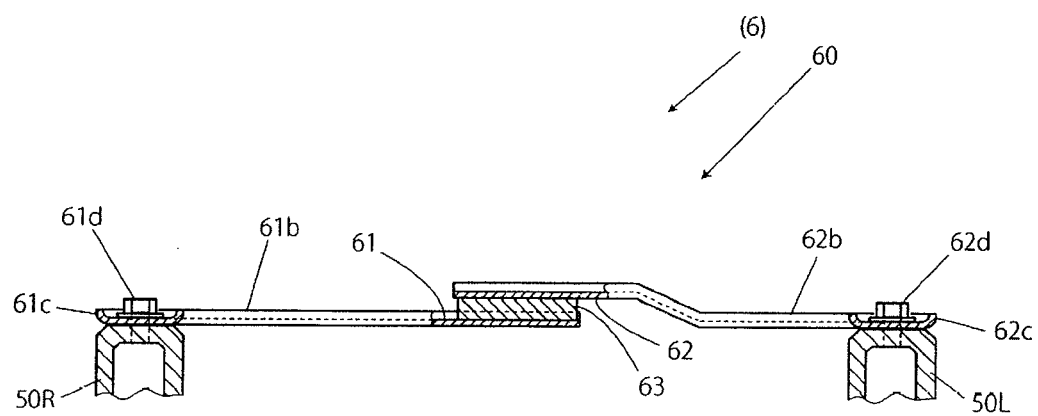
FIG. 10 is a partly omitted, enlarged cross-sectional view taken along X-X of FIG. 3.

See FIGS. 3 and 10

The vibration damping apparatus 60 may be disposed between the left and right seat rails 50L, 50R of the vehicle body frame 20 (see FIGS. 2, 3, and 5).

FIG. 10 is a partly omitted, enlarged cross-sectional view taken along X-X of FIG. 3.

Referring to FIG. 10, the vibration damping apparatus 60 can be formed as follows. Specifically, the surface 61 of the pair of surfaces 61, 62 is disposed on the side of a first seat rail (the right seat rail 50R in the example shown in FIG. 10) of the pair of left and right seat rails 50L, 50R and the other surface 62 is disposed on the side of a second seat rail (the left seat rail 50L in the example shown in FIG. 10). The damping member 63 which is fixed to each of the surfaces 61, 62 and to which no load is applied while the motorcycle 10 is stationary is then disposed between the pair of surfaces 61, 62.

The surface 61 can be formed with an upper surface of a member 61b having a U-shaped cross section and having a base 61c integrally secured to the right seat rail 50R with a bolt 61d. The surface 62 can be formed with a lower surface of a member 62b having a U-shaped cross section and having a base 62c integrally secured to the left seat rail 50L with a bolt 62d.

Since the stiffness of the seat rails 50L, 50R is maintained as described above, load can be prevented from being applied between the members 61b, 62b while the motorcycle 10 is stationary.

The pair of left and right seat rails 50L, 50R disposed on the vehicle body frame 20 may cause vibration unique to each of the left and right seat rails 50L, 50R to be produced while the motorcycle 10 is running.

In contrast, by disposing the first surface 61 on the side of the first seat rail (50R) of the pair of left and right seat rails 50L, 50R and the second surface 62 on the side of the second seat rail (50L), the vibration produced in each of the left and right seat rails 50L, 50R can be effectively damped.

As described earlier, the seat rail involves the various forms of vibration modes.

If, of the various forms of vibration modes, a mode that causes the seat rails 50L, 50R extending in the longitudinal direction of the vehicle body to be bent laterally (yaw-direction deformation mode) or one that causes the seat rails 50L, 50R to be twisted laterally (roll-direction deformation mode) occurs, the left and right seat rails 50L, 50R vibrate alternately to vary a distance therebetween.

Through the above-described arrangements made for the disposition example, the damping member 63 is deformed mainly in the shearing direction when the left and right seat rails 50L, 50R vibrate in the above mode.

As a result, vibration of the seat rails 50L, 50R (and thus the vehicle body frame 20) is effectively damped.

Figure 11:
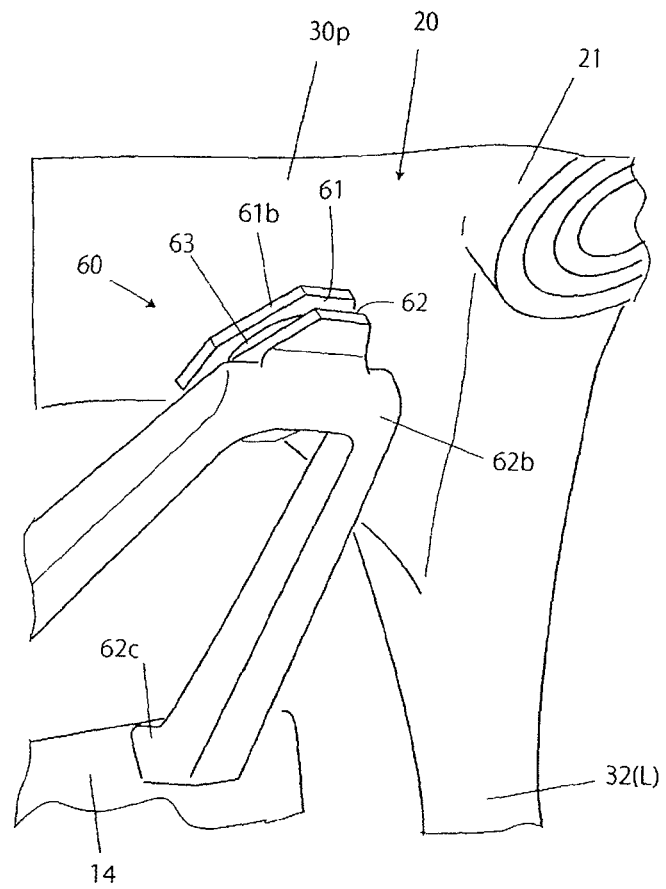
FIG. 11 is a perspective view showing a main section of another embodiment of the present invention.

FIG. 11 is a perspective view showing a main section of another embodiment of the present invention. In FIG. 11, like or corresponding parts are identified by the same reference numerals as those used in the embodiment described above.

Whereas the vibration damping apparatus 60 is disposed on the vehicle body frame 20 in the above-described embodiment, a vibration damping apparatus 60 is disposed between a vehicle body frame 20 and an engine 14 in the another embodiment of the present invention.

The another embodiment of the present invention includes, in a space between the vehicle body frame 20 and the engine 14, at least a pair of mutually facing surfaces 61, 62 that are not to be relatively displaced while the engine 14 and a motorcycle 10 are stationary and are to be relatively displaced while the engine 14 is operating or the motorcycle 10 is running. The surface 61 of the pair of surfaces 61, 62 is disposed on the side of the vehicle body frame 20 and the other surface 62 is disposed on the side of the engine 14. The damping member 63 which is fixed to each of the surfaces 61, 62 and to which no load is applied while the engine 14 and the motorcycle 10 are stationary is then disposed between the surfaces 61, 62.

The basic configuration of the vibration damping apparatus 60 shown in FIG. 4 may be applied to the another embodiment of the present invention by replacing one of the elements of the vehicle body frame 20 shown in the configuration of FIG. 4 with the engine 14.

The vibration damping apparatus 60 for a saddle riding type vehicle includes the damping member 63 that is fixed to each of the surfaces 61, 62 and disposed, in a space between the vehicle body frame 20 and the engine 14, between at least the pair of mutually facing surfaces 61, 62 that are to be relatively displaced while the motorcycle 10 is running or the engine 14 is operating. When, therefore, the operation of the engine 14 or the running of the motorcycle 10 results in vibration occurring to displace the pair of surfaces 61, 62 relatively to each other, the vibration is to be damped by the damping member 63. Since the pair of surfaces 61, 62 are disposed between the vehicle body frame 20 and the engine 14, vibration transmitted from the engine 14 to the vehicle body frame 20 is particularly effectively damped. Specifically, a vibration damping effect of the engine 14 and the vehicle body frame 20 can be achieved.

While the engine 14 and the motorcycle 10 are stationary, the surfaces 61, 62 are not relatively displaced and, while the engine 14 and the motorcycle 10 are stationary, no load is applied to the damping member 63 that is fixed to each of the surfaces 61, 62 between the pair of surfaces 61, 62. Should vibration occur causing the pair of surfaces 61, 62 to be displaced relatively, load (dynamic load) is applied to the damping member 63. Damping of vibration by the damping member 63 is therefore effectively performed for reasons as described above.

The fact that no load is applied to the damping member 63 fixed to each of the surfaces 61, 62 between the pair of surfaces 61, 62 while the engine 14 and the motorcycle 10 are stationary means that the damping member 63 does not act on stiffness of the vehicle body frame structure including the engine 14 as springs in series. Accordingly, in the vibration damping apparatus 60, the damping member 63 functions as springs in parallel, which makes it easy to achieve stiffness of the vehicle body frame structure including the engine 14 even if an elastic member having a low stiffness is used.

In addition, the vibration damping apparatus 60 can be configured by disposing, between the vehicle body frame 20 and the engine 14, at least the pair of mutually facing surfaces 61, 62 that are not to be relatively displaced while the engine 14 and the motorcycle 10 are stationary and are to be relatively displaced while engine 14 is operating or the motorcycle 10 is running and, in the space between the pair of surfaces 61, 62, the damping member 63 which is fixed to each of the surfaces 61, 62 and to which no load is applied while the engine 14 and the motorcycle 10 are stationary. The structure can therefore be simplified and improves the degree of freedom in disposition.

Specifically, the vibration damping apparatus 60 for a saddle riding type vehicle achieves effects of the stiffness of the vehicle body frame 20 being easily ensured, the simplified structure, and the improved degree of freedom in disposition. Moreover, an effective damping effect can be achieved when vibration does occur.

FIG. 11 shows one disposition example of the another embodiment of the present invention.

Referring to FIG. 11, the surface 61 can be formed with a lower surface of a flat sheet-like member 61b fixed to a lower surface of the connecting plate 30p immediately after the head pipe 21 in the vehicle body frame 20 and the surface 62 can be formed with an upper surface of a U-shaped member 62b that has a base 62c fixed integrally to an appropriate position of the engine 14.

Since the engine 14 is fixed to the engine hanger portions 32, 33 as described earlier, load can be prevented from being applied between the members 61b, 62b while the engine 14 and the motorcycle 10 are stationary.

In a running motorcycle 10, forced vibration is applied to the vehicle body frame 20 due to various vibrations of the engine 14.

In the disposition example, the foregoing arrangements allow vibration of the engine 14 and the vehicle body frame 20 to be damped.

In addition, vibration of the engine 14 can at times cause a phenomenon called chattering, in which the vibration is combined with vibration in the vertical (longitudinal, vertical) direction of the steering system ST mounted rotatably on the head pipe 21.

In the disposition example of the another embodiment of the present invention, the vibration damping apparatus 60 is disposed immediately rearwardly of the head pipe 21, which effectively inhibits chattering.

As described earlier, the basic configuration of the vibration damping apparatus 60 shown in FIG. 4 may be applied to the another embodiment of the present invention by replacing one of the elements of the vehicle body frame 20 shown in the configuration of FIG. 4 with the engine 14. This allows the vibration damping apparatus 60 to be disposed at any appropriate position between the vehicle body frame 20 and the engine 14. Disposition example (3) shown in FIG. 7 may be considered as a disposition example of the another embodiment of the present invention.

While the present invention has been particularly shown and described with reference to preferred embodiments, it will be understood by those skilled in the art that various changes in form and detail may be made therein without departing from the spirit and scope of the invention.

For example, to form the surfaces 61, 62 with the member 61b and the member 62b, the vibration damping apparatus 60 including the members 61b, 62b and the damping member 63 may be formed as an option.

What is claimed is:

1. A vibration damping apparatus for a saddle riding type vehicle having a vehicle body frame, comprising:
    at least a pair of mutually facing surfaces, disposed on the vehicle body frame, the surfaces not being relatively displaceable while the vehicle is stationary and being relatively displaceable while the vehicle is running; and
    a damping member fixed to each of the surfaces and disposed therebetween, the damping member not being subject to load while the vehicle is stationary,
    wherein the vehicle includes an engine mounted thereon;
    the vehicle body frame includes:
    a front-side engine hanger portion extending downwardly at a front portion of the engine and to which the front portion of the engine is fixed,
    a rear-side engine hanger portion extending downwardly at a rear portion of the engine and to which the rear portion of the engine is fixed, and
    a sub-frame connecting the front-side engine hanger portion and the rear-side engine hanger portion; and
    a first surface of the pair of surfaces is disposed on a side of the sub-frame and a second surface of the pair of surfaces is disposed on a side of the front-side engine hanger portion or the rear-side engine hanger portion.

2. A vibration damping apparatus for a saddle riding type vehicle having a vehicle body frame, comprising:
    at least a pair of mutually facing surfaces, disposed on the vehicle body frame, the surfaces not being relatively displaceable while the vehicle is stationary and being relatively displaceable while the vehicle is running; and
    a damping member fixed to each of the surfaces and disposed therebetween, the damping member not being subject to load while the vehicle is stationary, wherein:

the vehicle body frame includes a main frame extending longitudinally, and a seat rail, extending rearwardly from the main frame, for supporting a seat on which an occupant sits; and a first surface of the pair of surfaces is disposed on a side of the main frame and a second surface of the pair of surfaces is disposed on a side of the seat rail.

3. The vibration damping apparatus for a saddle riding type vehicle according to claim 1, wherein the damping member includes a high-damping rubber sheet on which a shearing force acts in a relative parallel displacement between each of the surfaces.

4. The vibration damping apparatus for a saddle riding type vehicle according to claim 2, wherein the damping member includes a high-damping rubber sheet on which a shearing force acts in a relative parallel displacement between each of the surfaces.

5. A vibration damping apparatus for a saddle riding type vehicle having a vehicle body frame and an engine disposed on the vehicle body frame, the vibration damping apparatus comprising: at least a pair of mutually facing surfaces, disposed in a space between the vehicle body frame and the engine, the surfaces not being relatively displaceable while the engine and the vehicle are stationary and being relatively displaceable while the engine is operating or the vehicle is running, a first surface of the pair of surfaces being disposed on a side of the vehicle body frame and a second surface of the pair of surfaces being disposed on a side of the engine; and a damping member fixed to each of the surfaces and disposed therebetween, the damping member not being subject to load while the engine and the vehicle are stationary:

wherein the damping member includes a high-damping rubber sheet on which a shearing force acts in a relative parallel displacement between each of the surfaces.

* * * * *